Oct. 25, 1927.

C. E. BAUERLE 1,647,111

MOTOR VEHICLE LOCK

Filed Aug. 13, 1925

Inventor
Charles E. Bauerle
by Kwis, Hudson
& Kent
Attorneys

Oct. 25, 1927. 1,647,111
C. E. BAUERLE
MOTOR VEHICLE LOCK
Filed Aug. 13, 1925 4 Sheets-Sheet 2
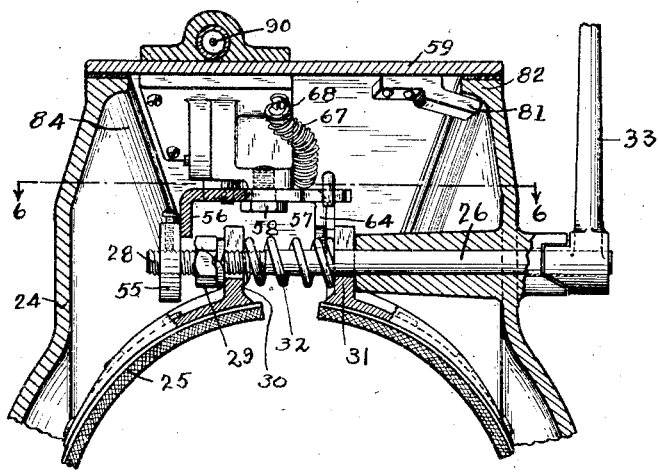
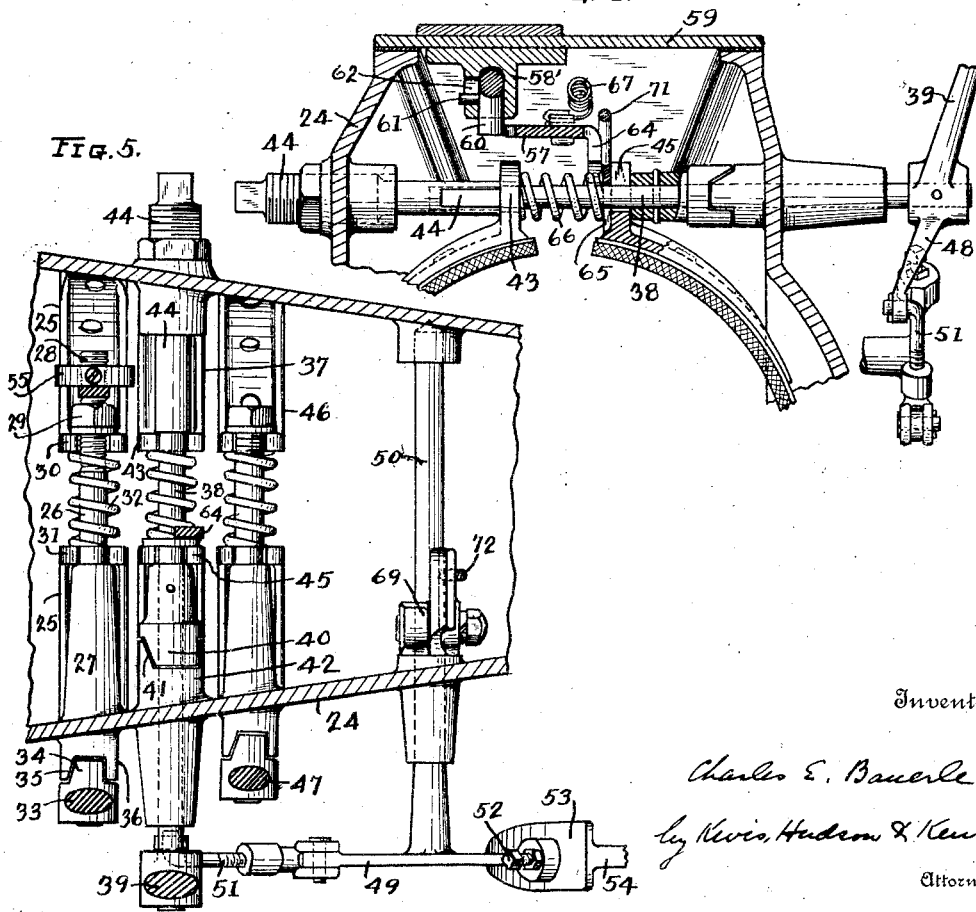
Inventor
Charles E. Bauerle
by Kwis, Hudson & Kent
Attorneys

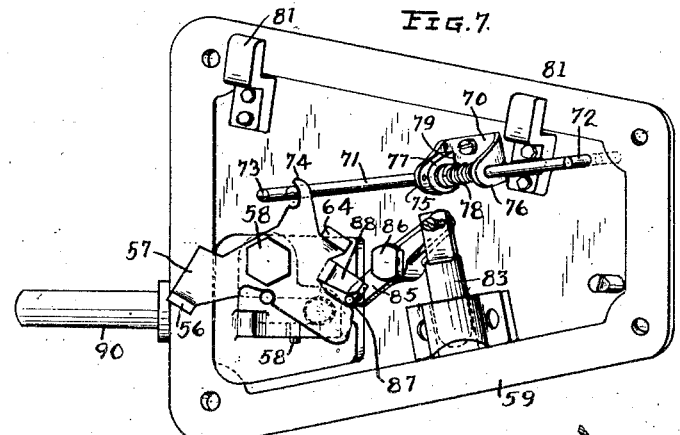

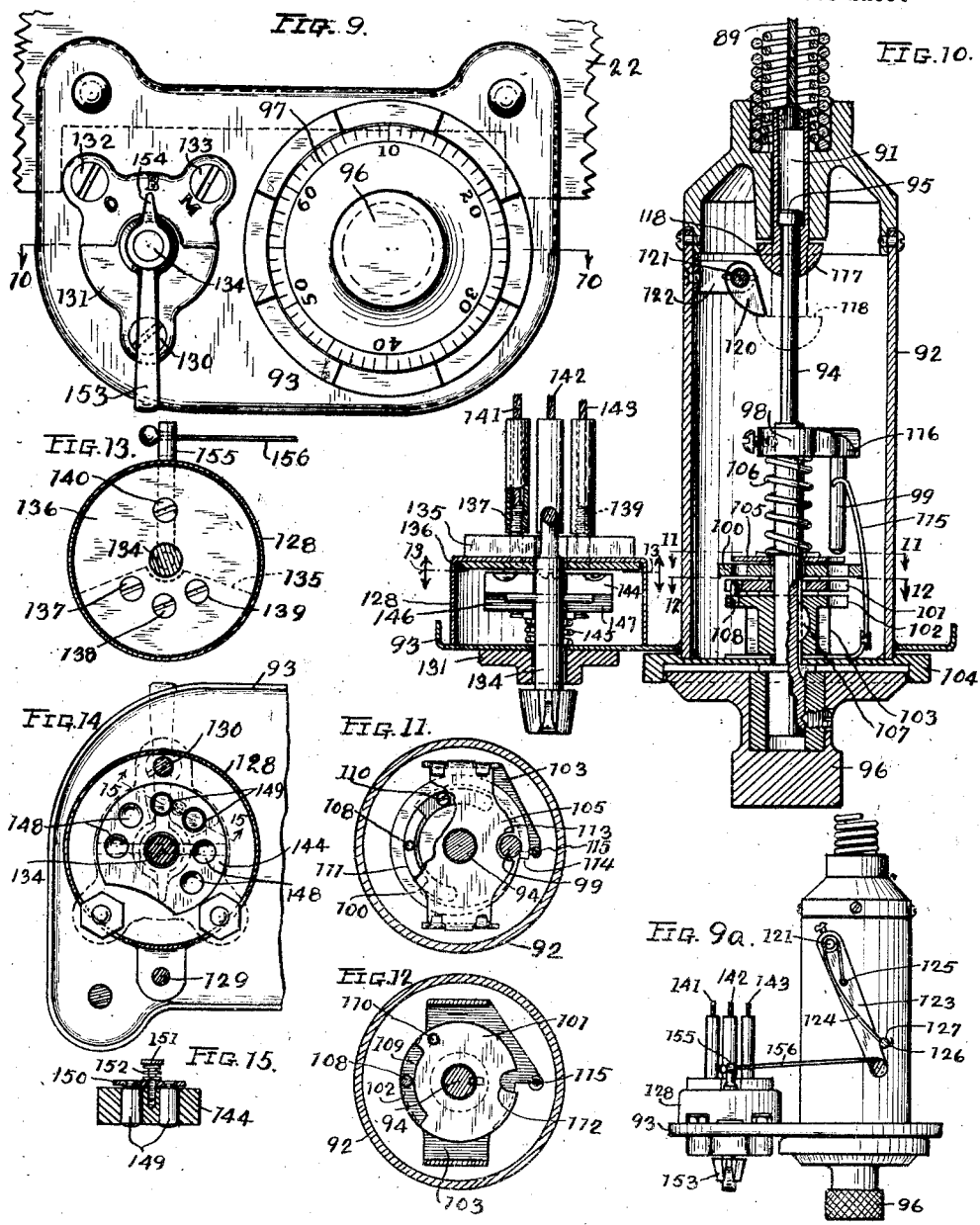

Patented Oct. 25, 1927.

1,647,111

UNITED STATES PATENT OFFICE.

CHARLES E. BAUERLE, OF CLEVELAND, OHIO, ASSIGNOR TO THE MOTOBILE PRODUCTS COMPANY, OF CLEVELAND, OHIO, A CORPORATION OF OHIO.

MOTOR-VEHICLE LOCK.

Application filed August 13, 1925. Serial No. 49,953.

This invention relates to locking devices, and more especially to means for so locking the transmission mechanism of the vehicle, as to prevent the vehicle from being driven by its own motor.

A further object of the invention is to provide a locking mechanism, of the type referred to, in which the transmission is automatically locked by the actuation of the control-switch to shut off the motor.

A further object of the invention is to provide a locking mechanism especially adapted for the transmission mechanism of a Ford automobile.

A further object of the invention is to provide a mechanical locking mechanism for the transmission of the vehicle, in which the unlocking operation sets the mechanism, so that it will be automatically locked upon the actuation of the control-switch, to shut off the motor.

Other objects of the invention, and the features of novelty, will be apparent from the following description taken in connection with the accompanying drawings, of which Fig. 1 is a diagrammatic elevation and section of a Ford automobile having my invention applied thereto;

Fig. 3 is a section on the line 3—3 of Fig. 2;

Fig. 4 is a section on the line 4—4 of Fig. 2;

Fig. 5 is a section on the line 5—5 of Fig. 2;

Fig. 7 is a plan view of the inside of the transmission case cover with the mechanism carried thereby;

Fig. 8 is a view similar to Fig. 7 but showing the parts in a different position;

Fig. 9 is an elevation of the control panel for the lock mechanism, which is attached to the vehicle dash;

Fig. 9ᵃ is a reduced plan view of the apparatus shown in Fig. 9;

Fig. 10 is a section on the line 10—10 of Fig. 9;

Fig. 11 is a section on the line 11—11 of Fig. 10;

Fig. 12 is a section on the line 12—12 of Fig. 10;

Fig. 13 is a section on the line 13—13 of Fig. 10 looking in the direction of the arrows that are pointed upward;

Fig. 14 is a section on the line 13—13 of Fig. 10 looking in the direction of the arrows that are pointed downward;

Fig. 15 is a section on the line 15—15 of Fig. 14; and

Fig. 16 is a section on the line 16—16 of Fig. 8.

Figure 1:
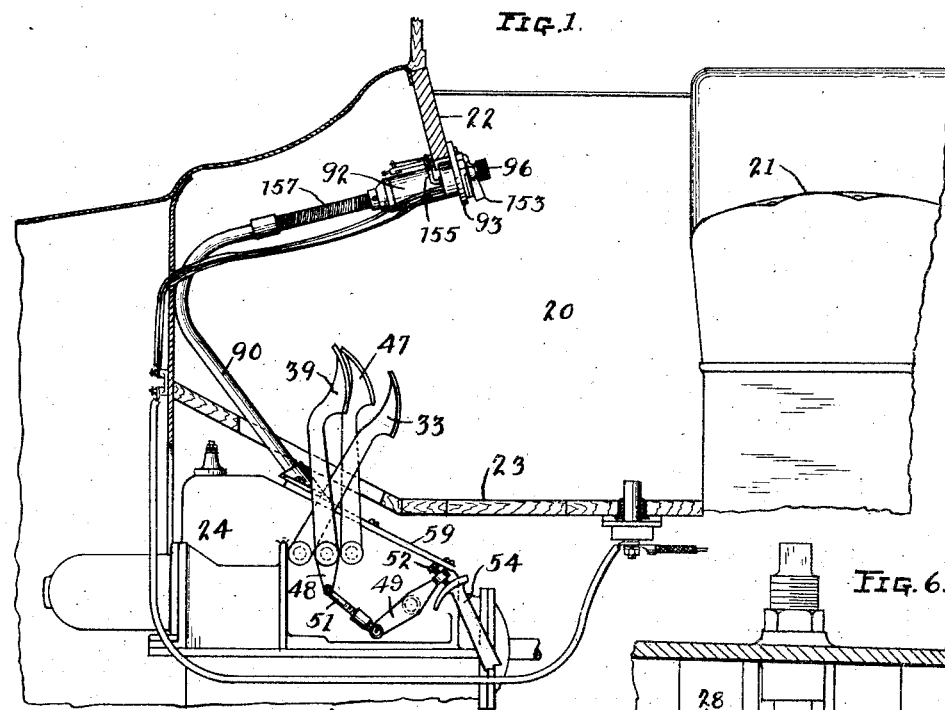

Referring to the drawings, and more especially to Fig. 1, 20 indicates a portion of the body of a motor vehicle having a driver's seat 21, a dash 22, the flooring 23 for the driver's compartment and the transmission gearing case, or housing, 24. The parts just referred to, illustrate the common form of construction used in the Ford automobile, and my invention is illustrated in connection therewith. In order to understand the application of my invention to the Ford automobile, it is not necessary to consider the details of the transmission mechanism further than to refer to the parts thereof with which the locking mechanism cooperates. I, therefore, illustrate in the drawings, the reverse friction band 25, which is actuated by the shaft 26, this shaft being rotatable and axially movable in the bearing 27 on the interior of the housing 24. The inner end of the shaft 26 is threaded, as indicated at 28, and carries a nut 29, which is adjustable thereon, and engages the ear 30 on the band 25. The ear 31, on the opposite end of the band, engages with the end of the bearing 27, and a coil spring 32, on the shaft 26, tends to separate the ears 30 and 31. The outer end of the shaft 26 carries the control pedal 33, the hub of this pedal having a lug 34 on one side, which engages with the cam surface 35 on the boss 36, on the exterior of the housing 24. The apparatus so far described, conforms to the usual standard practice of the Ford automobile, and, as is well understood by those familiar therewith, the transmission mechanism is set for the reverse drive by pressing the pedal 33 forward, this causing the shaft 26 to be moved axially, so as to contract the band 25.

Figures 2, 6:
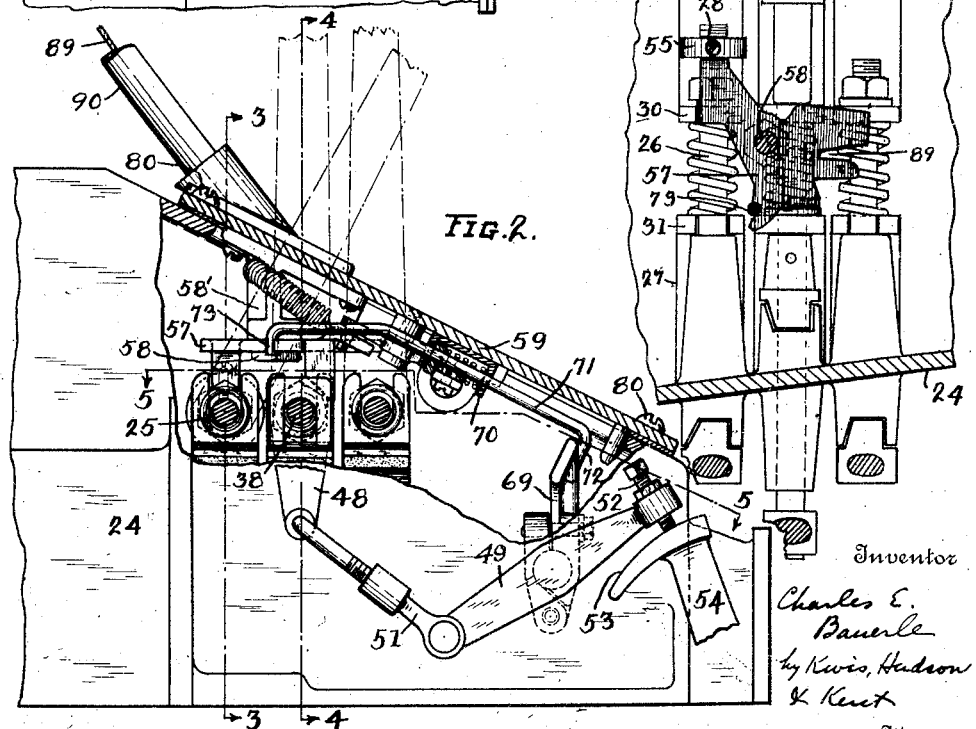
Fig. 2 is an enlargement of the transmission mechanism shown in Fig. 1, with certain parts broken away and other parts shown in section.
Fig. 6 is a section on the line 6—6 of Fig. 3.

The friction band 37 controls the low-speed drive and is actuated by the shaft 38, having an operating pedal 39, on its outer end, and a lug 40, within the housing 24, which cooperates with the cam surface 41 on the boss 42. The ear 43 on one end of the band 37, engages the end of the adjustable screw 44, and is held stationary thereby. The ear 45, on the opposite end of the band 37, engages the end of the lug 40 and, on account of the latter being pinned to the shaft 38, the band 37 is contracted by pressing the pedal 39 forward from the neutral position shown in Fig. 1. The service brake band is indicated at 46, and is actuated by the pedal 47. The pedal 39, has a downwardly extending arm 48, which is connected with a lever 49, on the clutch shaft 50, by means of a link 51. The lever 49 carries a set screw 52, which engages with the cam surface 53 on the arm 54, which is a part of the emergency brake mechanism of the automobile. When the set screw 52 engages the cam surface 53, as shown in Figs. 1 and 2, the emergency brake is set, and the clutch, of the transmission mechanism, is held in the neutral position, so that the vehicle cannot be driven by its motor. This is the usual position of these parts, when the vehicle is not running. When the emergency brake is released the arm 54 swings forward out of engagement with the set screw 52, thereby permitting the clutch (not shown) to be thrown in for the driving position.

Having thus described the usual construction and mode of operation of the transmission mechanism, it will be evident that, in order to completely lock the transmission mechanism, so as to prevent the vehicle from being driven by its motor, either in high speed, low speed, or in reverse, it is necessary to prevent the contraction of the friction bands 25 and 37, and also to prevent the clutch shaft 50 from rotating under the influence of the clutch spring (not shown) when the emergency brake is released, and the set screw 52 is out of engagement with the cam surface 53. In order to accomplish these results, I secure on the threaded end 28, of the shaft 26, a nut 55 with which a downwardly projecting finger 56, on the plate 57, cooperates. The plate 57 is mounted on a pivot 58, on a bracket 58', on the cover 59, of the housing. A locking bolt, or detent, 60, is slidably mounted in the bracket 58', being held against rotation by the pin 61, which slides in the slot 62. A spring 63, normally tends to force the detent 60 downwardly into locking engagement with the plate 57, such locking engagement being illustrated in Figs. 4 and 8. The plate 57 also has a downwardly projecting finger 64, which is adapted to engage a U-shaped block 65 which I mount on the shaft 38, between the end of the spring 66 and ear 45.

A spring 67, has one end attached to a stationary screw 68, on the cover 59, and the other end connected with the plate 57, so as to normally tend to turn the plate 57 on the pivot 58, from the position shown in Fig. 7, to that shown in Fig. 8.

I clamp an arm 69 on the clutch shaft 50, and secure to the inner side of the cover 59, a bracket 70, in which a rod 71 is slidably mounted. The rod 71 has a downwardly turned end 72 to engage with the arm 69, when the clutch is in the neutral position, as shown in Fig. 2, thereby preventing the clutch shaft 50 from rotating in a clock-wise direction and retaining the clutch in its neutral or non-driving position. The forward end of the rod 71 is turned downwardly, as indicated at 73, to engage with a lug 74 on the plate 57, such engagement holding the rod against rearward movement when the plate 57 is held by the detent 60. Between the arms 75 and 76, of the bracket 70, the rod 71 carries a washer 77 which is pinned to the rod, and engaged by one end of the spring 78, the opposite end of which abuts the arm 76, so that the spring tends to move the rod 71 forward, and hold the washer 77 against the arm 75. In order to prevent rotation of the rod 71, the washer 77 has a flattened side 79, which cooperates with the lower surface of the bracket 70 and slides thereon, when the rod 71 moves.

From the foregoing description, it will be apparent that when the plate 57 is held by the detent 60, the finger 56 will prevent contraction of the band 25, and the finger 64 will prevent contraction of the band 38, also the rod 71, being held against rearward movement by the plate 57, will prevent rotation of the clutch shaft 50 in the direction to throw in the clutch, so that the transmission mechanisms will then be completely locked, and it will be impossible to move the pedals 33 and 39. However, such locking of the transmission mechanism, would not be completely effective, unless the cover for the transmission housing is locked, so that it cannot be removed, because the locking parts, for the transmission, are carried by the cover, and the removal of the cover would permit the vehicle to be driven in the usual manner. In addition, therefore, to the usual screws 80 for securing the cover in position, I provide means on the interior of the cover which prevent its removal even though the screws 80 are taken out. Such locking means for the cover, consist of a pair of lugs 81, which are adapted to engage the flange 82, on the housing 24, and a sliding bolt 83, on the opposite side of the cover, which is adapted to engage with a corresponding flange 84 on the opposite side of the housing. The engagement of one of the lugs 81 with the flange 82 is shown in Fig. 3, and the sliding bolt 83 engages with the flange 84, in a similar manner, so that it will be obvious that these two lugs, and the bolt, will prevent the removal of the cover. It is sometimes necessary to remove the cover 59, and I have, therefore, provided means for withdrawing the bolt 83 from engagement with the flange 84, such means consisting of a lever 85 that is mounted on a pivot 86, on the inside of the cover, and carries a pin 87, which cooperates with a cam slot 88, on the plate 57, the turning of the plate 57, from the position shown in Fig. 8, to that shown in Fig. 7, withdrawing the bolt 83 from engagement with the flange 84. Since the plate 57 is normally in the position shown in Fig. 8, when the vehicle is not being operated, it is necessary to turn the plate 57 to the position shown in Fig. 7, in order to withdraw the bolt 83, and this may be accomplished by depressing either of the pedals 33 or 39.

As hereinbefore stated, the transmission mechanism is locked by holding the plate 57 in the position shown in Fig. 8, by means of the bolt, or detent, 60, and, in order to unlock the mechanism, this bolt or detent, must be withdrawn to its inoperative position, in which the plate 57 is free to turn on its pivot. Such withdrawal of the bolt 60, is accomplished by means of a wire, or flexible rod, 89 which extends through the hardened steel tube 90 and has its upper end soldered, or otherwise secured to a slidable member 91, in a housing 92, that is carried by a panel 93, mounted on the dash 22. The member 91 is of tubular form and has a telescopic connection with a rod 94, the latter having a head 95, within the member 91, which engages a shoulder in the latter, so that the member 91 may be drawn toward the panel 93 by means of the rod 94. The rod 94 extends through the housing 92 and carries a knob 96 on its outer end, this knob being provided with a graduated dial 97, resembling the dial on an ordinary combination lock for a safe. Within the housing 92, the rod 94 carries an arm 98 which, in turn, carries a longitudinally extending rod 99 that cooperates with the series of discs, or tumblers 100, 101 and 102, that are mounted on the rod 94 and constitute the means for locking the rod 94 against axial movement. A substantially U-shaped frame 103, is secured against the end wall 104 of the housing 92, and encloses the tumblers 100, 101 and 102. This frame also carries a cross-member or bridge-piece 105, through which the rod 94 extends. A spring 106 is arranged between the cross member 105 and the arm 98 and tends to force the rod 94 upwardly, as seen in Fig. 10. The tumbler 102 carries a key 107 which has a feather connection with the rod 94, so that the tumbler partakes of all of the turning movements of the rod, but the rod is permitted to move axially therethrough. The tumbler 102 carries a pin 108 that moves in a circumferential recess 109 in the tumbler 101, the engagement of the pin 108 with the ends of this recess, causing both tumblers to be moved together, as is necessary in order to set the combination. The tumbler 101 carries a pin 110 which projects into a circumferential slot 111 in the tumbler 100, so that the tumbler 100 will be picked up and caused to rotate, under certain conditions, by the tumbler 101. Each of the tumblers is provided with a marginal recess 112, and, when these recesses are set in alignment, as shown in Fig. 10, the rod 99 is permitted to pass through them when the rod 94 is drawn upward by means of the knob 96. The cross member 105 has a marginal recess 113 with which the recesses 112 are aligned when the tumblers are set in the unlocking position of the mechanism. The tumbler 100 has a radially extending shoulder 114 on its periphery that is adapted to be engaged by a spring wire 115 that is secured to the frame 103, as shown in Figs. 10 and 12, and is under permanent tension tending to constantly press it against the tumbler 100.

When the parts are in the relation shown in Figs. 10 and 11, the spring 115 engages the periphery of the tumbler 100 (see Fig. 11) and does not engage the abutment 114. As shown in these figures, the parts are in position to permit the rod 94 to be drawn outwardly, which, in turn, will also move the member 91, the wire 89, and the bolt 60. As the rod 94 is drawn outward, by means of the knob 96, a projection 116, on the arm 98, engages with the spring 115 and deflects it slightly, so as to move the spring into engagement with the shoulder 114. As the parts are seen in Fig. 11, the movement of the spring 115 is clockwise. Upon the completion of the outward movement of the rod 94, the knob 96 is released and the spring 106 returns the rod quickly to the position shown in Fig. 10. The projection 116 is thus disengaged from the spring 115 permitting the latter to return to its normal position, and in doing so, the tumbler 100 is rotated, because of the engagement of the spring 115 with the shoulder 114, sufficiently to carry its recess 112 out of alignment with the rod 99, and thus lock the rod 94 against a second withdrawal, without resetting the combination. The member 91 has a head 117, with a shoulder 118 thereon, and when the bolt 60 is withdrawn, as just described, the member 91 is moved to the dotted line position shown in Fig. 10, in which a detent 120 engages with the shoulder 118, and thus holds the member 91 in the dotted line position, which also serves to hold the bolt 60 in its inoperative position.

The detent 120 is fixed on a shaft 121 that is mounted in a bracket 122 in the housing 92. The shaft 121 extends to the exterior of the housing and carries an arm 123 by means of which the shaft may be rocked to disengage the detent 120 from the shoulder 118. A spring 124 is coiled about the shaft 121 and has the end 125 connected with the arm 123 and the end 126 anchored to a stud 127 on the housing 92. The spring 124 tends to swing the arm 123 to the right, as seen in Fig. 9ª, to effect the engagement of the detent 120 with the shoulder 118.

The panel 93 also carries an ignition switch comprising a casing 128, which is secured to the panel 93 by screws 129 and 130. A plate 131 is secured to the face of the panel 93 by the screws 130, 132 and 133 and an actuating shaft 134 is supported in the plate 131 and the rear wall of the casing 128. On the exterior of the rear wall of the casing 128, there is a block 135, of insulating material, and on the inner side of this wall, there is a disc 136 of insulating material, the block and disc being secured in position by the contact screws 137, 138 and 139, and the disc 136 being additionally secured by the screw 140. An ignition circuit wire 141 is connected with the screw 137, the wire 142 being connected with the screw 138, and the wire 143 being connected with the screw 139. Within the casing 128, the shaft 134 carries a disc 144, of insulating material, which is yieldingly pressed toward the disc 136 by a spring 145. The disc 144 is connected with the shaft 134, so as to rotate therewith, by means of a pin 146, and a transverse slot 147 in the disc. The heads of the contact screws 137, 138 and 139 are preferably of hemispherical form, and cooperate with a series of correspondingly shaped recesses 148, in the disc 144, to retain the latter in the different positions to which it is adjusted. The disc 144 also carries a pair of contact members 149 which extend therethrough (see Fig. 15) and are connected together by a plate 150. A screw 151 is mounted in the disc 144 and carries a spring 152 which cooperates with the plate 150 to yieldingly press the contact members 149 against the screws 137, 138 and 139.

The wires 141 and 142 are a part of the magneto ignition circuit, and, when the members 149 engage the contact screws 137 and 138, respectively, the magneto circuit is closed. The wires 142 and 143 constitute a part of the battery ignition circuit, and, when the members 149 are in contact with the screws 138 and 139, the battery ignition circuit is closed. When the disc 144 is turned so that the members 149 do not contact with two of the screws 137, 138 and 139, neither of the ignition circuits is closed, and it is not possible to operate the vehicle motor.

An operating lever 153 is secured to the shaft 134 and has a pointer 154 adapted to register with the letters "O", "B" and "M" on the plate 131. When the pointer 154 registers with the letter "O" both of the ignition circuits are open, and the switch is in the "off" position. When the pointer 154 registers with the letter "B" the battery circuit is closed, and when the pointer registers with the letter "M" the magneto circuit is closed.

The shaft 134 carries an arm 155 on its inner end, and this arm is connected with the arm 123 by a wire 156, this wire having a sliding connection with the arm 155, and the parts being so arranged that the arm 123 is actuated to disengage the detent 120 from the shoulder 118 when the lever 153 is actuated to turn the ignition switch to the "off" position, to stop the vehicle motor.

For convenience of installation, I provide a section of flexible tubing 157 between the tube 90 and the housing 92, this flexible tubing being preferably made of two telescoped spiral springs that are closely wound in opposite directions, as this construction is very difficult to cut with a hacksaw.

In the operation of the locking mechanism, assuming that the bolt 60 is in position to hold the plate 57 against movement, and thereby lock the transmission mechanism, and the ignition switch is in the "off" position, the knob 96 is rotated first in one direction, and then the other to set the tumblers of the combination lock in position to align the recesses 112 with the recess 113 and the rod 99. The knob 96 is then drawn outwardly as far as the mechanism will permit, the detent 120 being thereby permitted to engage the shoulder 118 and hold the bolt 60 in its inoperative position. The knob 96 is then released and it will be returned to the position shown in Fig. 10, by means of the spring 106, the rod 94 sliding in the member 91. Upon this return movement, the spring 115 kicks the tumbler 100 so as to carry the recess 112 therein out of alignment with the recess 113, thereby preventing the knob 96 from being again drawn out, until the combination has been reset. The transmission mechanism is thus unlocked and and the ignition switch may be set to permit the operation of the motor. When the vehicle is stopped, the transmission mechanism is relocked by simply turning the ignition switch to the "off" position, this operation disengaging the detent 120 from the shoulder 118, and permitting the bolt 60 to be returned to its operative position, in which it holds the plate 57 from being moved. The combination lock, associated with the rod 94, having been previously actuated by the spring 115, to lock the rod 94, it is impossible to withdraw the bolt 60 to its inoperative position without again setting the combination.

From the foregoing description, it will be apparent that I have provided a locking mechanism for the transmission, that will be automatically locked by the simple operation of shutting off the vehicle motor, thus requiring no additional operation on the part of the operator, or any thought on his part, of locking the vehicle. I am aware that various forms of transmission locks have heretofore been proposed, but such locks have usually involved the use of a key or other device, which must be used as an additional operation to shutting off the vehicle motor, thereby requiring the vehicle operator to give thought to the matter of locking the vehicle. Experience has proved that operators frequently neglect or forget to lock devices of that kind, with the result that the vehicle remains unlocked, either purposely or unintentionally, and is, therefore, subject to theft. With my improved locking mechanism, however, the operator automatically locks the transmission when the motor is stopped and therefore no thought with reference to the locking of the vehicle is required of the operator.

Having thus described my invention, I claim:

1. In apparatus of the class described, the combination with the transmission gearing of a motor vehicle and a control lever associated therewith, of a member and means associated therewith for rendering said lever inoperative, lock-controlled means for moving said member to its inoperative position, a device for retaining said member in the inoperative position, means for automatically moving said member to its operative position, a control switch for the vehicle motor, and means connecting said switch with said device and whereby said device is actuated to release said member when the switch is actuated to shut off the motor.

2. In apparatus of the class described, the combination with a motor vehicle transmission having a plurality of forward speeds and a reverse speed and a plurality of control levers therefor, of means for rendering said levers inoperative including a spring-actuated detent, lock-controlled means for moving said detent to its inoperative position, a device for holding said detent in its inoperative position, a control switch for the vehicle motor, and means connecting said switch with said device and whereby said device is actuated to release said detent when the switch is actuated to shut off the motor.

3. In apparatus of the class described, the combination with the transmission mechanism of a motor vehicle and a control lever associated therewith, of a member for rendering said lever inoperative, a manually operable lock-controlled member on the vehicle dash, a detent to engage the first-mentioned member and hold it in operative position, means operatively connecting the second-mentioned member with said detent to permit withdrawal of the detent from engagement with the first-mentioned member, means for moving said detent into position to engage the first-mentioned member, a control switch for the vehicle motor, means for automatically locking said lock-controlled member upon the movement of said detent to its inoperative position, and means for holding said detent out of engagement with the first-mentioned member operatively connected with said switch and actuated thereby to release the detent when the switch is actuated to shut off the vehicle motor.

4. In apparatus of the class described, the combination with the transmission mechanism of a motor vehicle and a control lever associated therewith, of a member for rendering said lever inoperative, a spring-returned manually operable lock-controlled member, a detent to engage the first-mentioned member and hold it in operative position, means, comprising a lost-motion device, operatively connecting said lock-controlled member with said detent to permit withdrawal of the detent from engagement with the first-mentioned member, spring means for moving said detent into position to engage the first-mentioned member, a control switch for the vehicle motor, and means for holding said detent out of engagement with the first-mentioned member operatively connected with said switch and actuated thereby to release the detent when the switch is actuated to shut off the vehicle motor.

5. In apparatus of the class described, the combination with the transmission mechanism of a motor vehicle and a control lever associated therewith, of a member for rendering said lever inoperative, a spring-returned manually operable lock-controlled member, a detent to engage the first-mentioned member and hold it in operative position, means comprising a lost-motion device, operatively connecting said lock-controlled member with said detent to permit withdrawal of the detent from engagement with the first-mentioned member, spring means for moving said detent into position to engage the first-mentioned member, a control switch for the vehicle motor, means for automatically locking said lock-controlled member upon the movement of said detent to its inoperative position, and means for holding said detent out of engagement with the first-mentioned member operatively connected with said switch and actuated thereby to release the detent when the switch is actuated to shut off the vehicle motor.

6. In apparatus of the class described, the combination with the transmission mechanism of a motor vehicle and a control lever therefor, of means for rendering said lever inoperative to set said transmission to propel the vehicle, a detent cooperating with said means to hold the latter in the position in which said lever is rendered inoperative, lock-controlled means for withdrawing said detent from the position in which it holds the first-mentioned means, and means for automatically actuating the lock of said lock-controlled means to lock the latter upon the withdrawal of said detent.

7. In apparatus of the class described, the combination with the transmission mechanism of a motor vehicle and a control lever therefor, of means for rendering said lever inoperative to set said transmission to propel the vehicle, a detent cooperating with said means to hold the latter in the position in which said lever is rendered inoperative, lock-controlled means for withdrawing said detent from the position in which it holds the first-mentioned means, manually releasable means for holding said detent in its inoperative position, and means for automatically actuating the lock of said lock-controlled means to lock the latter upon the withdrawal of said detent.

8. In apparatus of the class described, the combination with the transmission mechanism of a motor vehicle and a control lever therefor, of means for rendering said lever inoperative to set said transmission to propel the vehicle, a detent cooperating with said means to hold the latter in the position in which said lever is rendered inoperative, lock-controlled means for withdrawing said detent from the position in which it holds the first-mentioned means, manually releasable means for holding said detent in its inoperative position, spring means for returning said detent to its operative position, and means for actuating the lock of said lock-controlled means to lock the latter upon the withdrawal of said detent.

9. In apparatus of the class described, the combination with the transmission mechanism of a motor vehicle and a control lever therefor, of means including a detent for rendering said control lever inoperative, lock-controlled means for withdrawing said detent to its inoperative position and thereby permit the use of said lever, and means for automatically actuating the lock of said lock-controlled means to lock the latter upon the withdrawal of said detent.

10. In apparatus of the class described, the combination with the transmission mechanism of a motor vehicle and a control lever therefor, of means including a detent for rendering said control lever inoperative, lock-controlled means for withdrawing said detent to its inoperative position and thereby permit the use of said lever, means for automatically actuating the lock of said lock-controlled means to lock the latter upon the withdrawal of said detent, and means operable while said lock-controlled means is locked to return said detent to its operative position.

11. In apparatus of the class described, the combination with the transmission mechanism of a motor vehicle and a control lever therefor, of means including a detent for rendering said control lever inoperative, lock-controlled means for withdrawing said detent to its inoperative position and thereby permit the use of said lever, means for automatically actuating the lock of said lock-controlled means to lock the latter upon the withdrawal of said detent, means operable while said lock-controlled means is locked to return said detent to its operative position, and a manually releasable device for holding said detent in its inoperative position.

12. In apparatus of the class described, the combination with the transmission mechanism of a motor vehicle and a control lever therefor, of a casing for said mechanism having a removable cover, means for rendering said lever inoperative and for locking said cover against removal, a detent cooperating with said means to lock the same in its operative position, manually operable lock-controlled means for withdrawing said detent to its inoperative spring means for returning said detent to its operative position, and a manually releasable device for retaining said detent in its operative position.

13. In apparatus of the class described, the combination with the transmission mechanism of a motor vehicle and a control lever therefor, of a casing for said mechanism having a removable cover, means for rendering said lever inoperative and for locking said cover against removal, a detent cooperating with said means to lock the same in its operative position, manually operable lock-controlled means for withdrawing said detent to its inoperative position, spring means for returning said detent to its operative position, a device for retaining said detent in its inoperative position, a control switch for the vehicle motor, and a connection between said switch and said device whereby said detent is released upon the actuation of said switch.

14. In apparatus of the class described, the combination with a vehicle transmission comprising a plurality of friction bands and a clutch operating means, actuating means for said bands, locking means for said band-actuating means and said clutch operating means, a detent associated with said locking means to hold the latter in locking position, manually operable lock-controlled means for withdrawing said detent from its operative position, means for returning said detent to its operative position, and manually releasable means for holding said detent in its inoperative position.

15. In apparatus of the class described, the combination with a vehicle transmission comprising a plurality of friction bands and a clutch operating means, actuating means for said bands, locking means for said band-actuating means and said clutch operating means, a detent associated with said locking means to hold the latter in locking position, manually operable lock-controlled means for withdrawing said detent from its operative position, means for returning said detent to its operative position, manually releasable means for holding said detent in its inoperative position, and means for automatically locking said lock-controlled means upon the operation of the latter to withdraw said detent.

16. In apparatus of the class described, in combination with the transmission mechanism of a motor vehicle and control means therefor comprising a plurality of friction bands and means for actuating them, of a pivotal member cooperating with said band-actuating means, and a bolt adapted to be interposed in the path of said member to prevent movement thereof and thereby lock said band actuating means against operation.

17. In apparatus of the class described, in combination with the transmission mechanism of a motor vehicle and control means therefor comprising a plurality of friction bands and means for actuating them, of a pivotal member cooperating with said band-actuating means, a bolt adapted to be interposed in the path of said member to prevent movement thereof and thereby lock said band-actuating means against operation, and manually operable means on the vehicle dash for moving said bolt.

18. In apparatus of the class described, in combination with the transmission mechanism of a motor vehicle and control means therefor comprising a plurality of friction bands and means for actuating them, of a pivotal member cooperating with said band-actuating means, a bolt adapted to be interposed in the path of said member to prevent movement thereof and thereby lock said band-actuating means against operation, manually operable means on the vehicle dash for withdrawing said bolt from cooperation with said member, and spring means for returning said bolt to its operative position.

19. In apparatus of the class described, in combination with the transmission mechanism of a motor vehicle and control means therefor comprising a plurality of friction bands and means for actuating them, of a pivotal member cooperating with said band-actuating means, a bolt adapted to be interposed in the path of said member to prevent movement thereof and thereby lock said band-actuating means against operation, manually operable means on the vehicle dash for withdrawing said bolt from cooperation with said member, spring means for returning said bolt to its operative position and automatically operating means for locking said manually operable means upon the withdrawal of said bolt to prevent the bolt from being again withdrawn after it has been returned by said spring means.

20. In apparatus of the class described, in combination with the transmission mechanism of a motor vehicle and control means therefor comprising a plurality of friction bands and means for actuating them, of a pivotal member cooperating with said band-actuating means, a bolt adapted to be interposed in the path of said member to prevent movement thereof and thereby lock said band actuating means against operation, manually operable means on the vehicle dash for withdrawing said bolt from cooperation with said member, spring means for returning said bolt to its operative position, and automatically operating means for locking said manually operable means between successive operations of the latter.

21. In apparatus of the class described, the combination of a locking bolt, manually operable lock-controlled means for withdrawing said bolt from its operative position, a device for retaining said bolt in inoperative position, a control switch for the vehicle motor and means connecting said switch and said device to actuate the latter to release said bolt when said switch is actuated.

22. In apparatus of the class described, the combination of a panel to be attached to a vehicle dash, a combination lock on said panel, a rotatable and axially movable knob for setting the combination of said lock, a locking member controlled by the axial movement of said knob, a device carried by said panel and adapted to retain said locking member in the position to which it is moved by said knob, a switch carried by said panel, and means connecting said switch with said device.

In testimony whereof, I hereunto affix my signature.

CHARLES E. BAUERLE.